Feb. 26, 1952 J. B. STEVENS ET AL 2,587,405
SEAL FOR RELATIVELY ROTATING MEMBERS
Filed Jan. 15, 1947
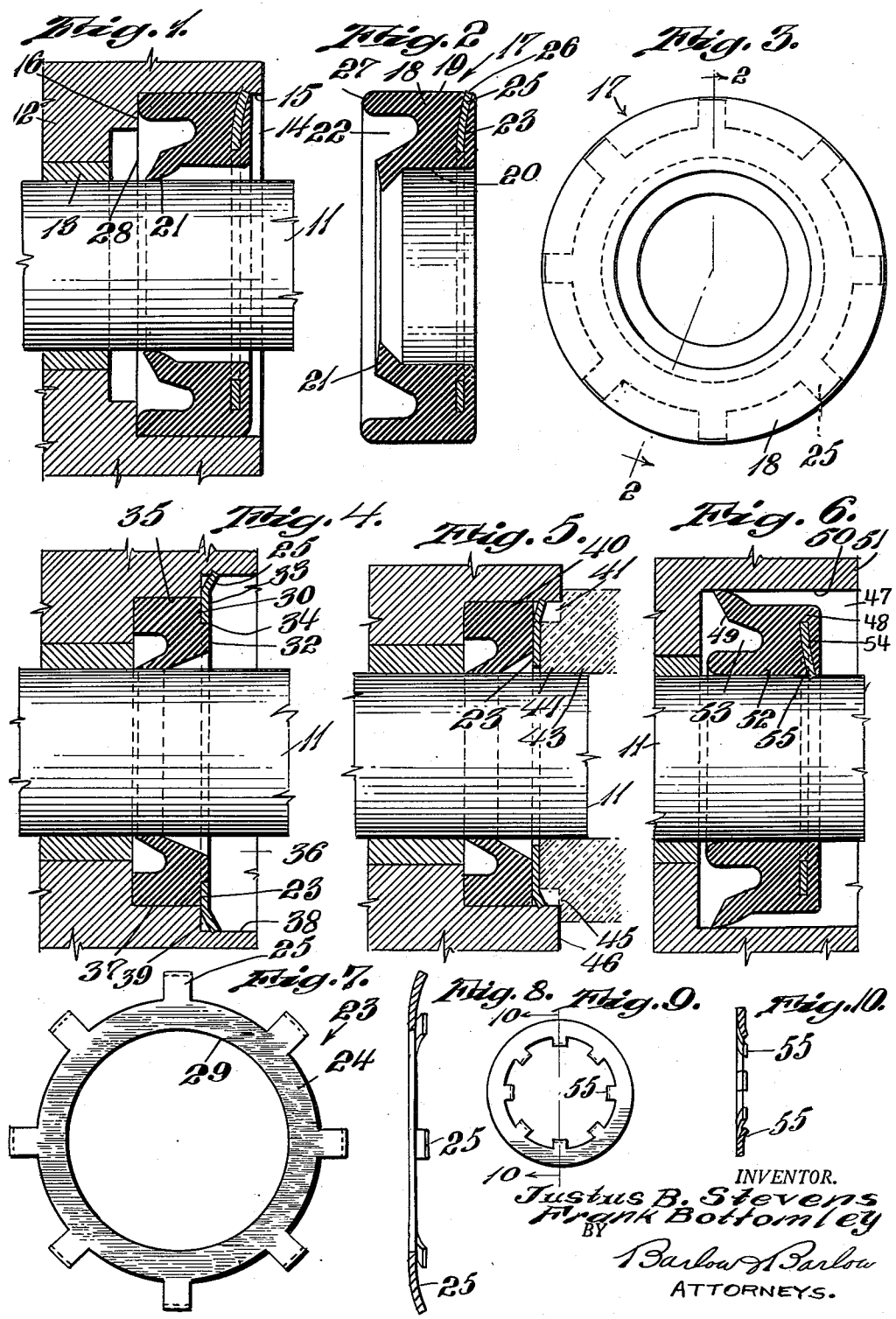
INVENTOR.
Justus B. Stevens
Frank Bottomley
BY
Barlow & Barlow
ATTORNEYS.

Feb. 26, 1952 J. B. STEVENS ET AL 2,587,405
SEAL FOR RELATIVELY ROTATING MEMBERS
Filed Jan. 15, 1947 2 SHEETS—SHEET 2
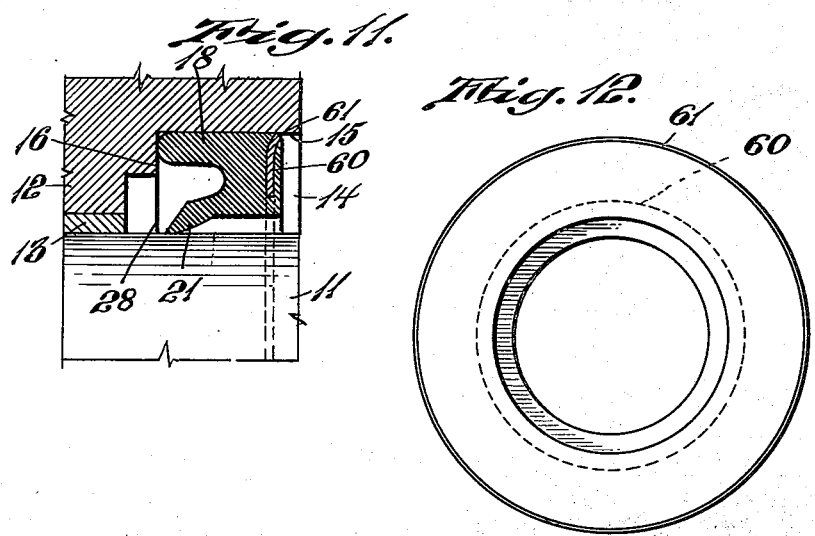
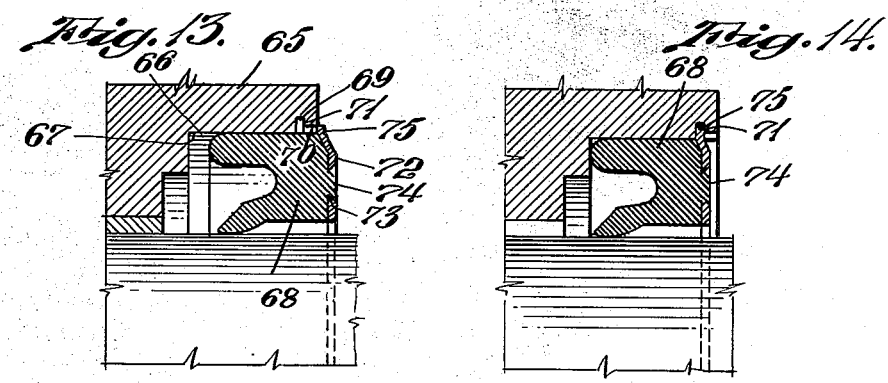
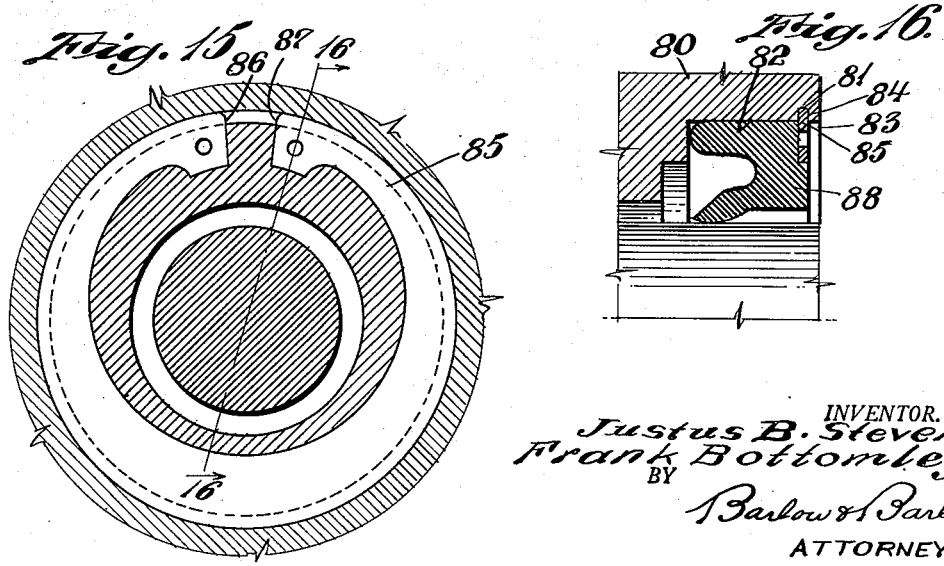
INVENTOR.
Justus B. Stevens
Frank Bottomley
BY
Barlow & Barlow
ATTORNEYS.

Patented Feb. 26, 1952

2,587,405

UNITED STATES PATENT OFFICE 2,587,405

SEAL FOR RELATIVELY ROTATING MEMBERS

Justus B. Stevens, East Providence, and Frank Bottomley, Barrington, R. I., assignors to Sealol Corporation, a corporation of Rhode Island Application January 15, 1947, Serial No. 722,106

5 Claims. (Cl. 286—5)

This invention relates to a seal usually used for sealing a shaft which extends through a case or housing in which some fluid is contained.

In order to prevent the leakage of fluid from some casing or housing through which the shaft extends, it has been usual to either provide a stuffing box, a packing gland or some sort of a rotary seal unit which comprises a casing in which some resilient parts are located, the casing being forced into a recess in the housing or stationary part to surround the shaft which is to be sealed. The housing maintains its tight fit with the stationary part by reason of its forced fit into the recess, while the resilient mechanism within the housing serves to maintain the running or rotary seal with the rotating part or some part secured thereto.

One of the objects of this invention is to provide a structure which will be much more simplified than the usual unit which is made up of a housing with resilient mechanism contained within.

Another object of this invention is to utilize resilient material which may be compressed and a washer having spring portions to maintain the compression thereof and prevent axial movement of a resilient material so as to form a seal within a recess in the housing located about the shaft.

Another object of this invention is to provide an arrangement so that the seal may be easily and quickly assembled on the shaft in a much simpler manner than seals heretofore have been assembled.

Another object of this invention is to provide an arrangement so that the compression of the sealing member may be controlled when forced into sealing position.

With these and other objects in view, the invention consists of certain novel features of construction as will be more fully described and particularly pointed out in the appended claims.

In the accompanying drawings:

Fig. 1 is a sectional view showing the seal assembled with a casing and shaft;

Fig. 2 is a sectional view on line 2—2 of Fig. 3 of the sealing element alone;

Fig. 3 is an end view of the element shown in Fig. 2;

Fig. 4 is a view similar to Fig. 1 showing a modified arrangement of washer and element;

Fig. 5 is a view similar to Fig. 1 showing a still different modified arrangement of washer and element;

Fig. 6 is a section view showing a different modified form and illustrating the engaging spring fingers extended radially inwardly instead of radially outwardly;

Fig. 7 is a plan view of the washer alone;

Fig. 8 is a sectional view thereof;

Fig. 9 is a plan view of the washer such as utilized in the showing of Fig. 6;

Fig. 10 is a sectional view thereof;

Fig. 11 is a sectional view of a fragmental portion of a modified seal in assembled position with a casing and shaft;

Fig. 12 is an end view of the sealing unit alone of Fig. 11;

Fig. 13 is a view similar to Fig. 11 illustrating a modified form of sealing unit and casing and showing the unit as being assembled in position.

Fig. 14 is a view similar to Fig. 13 but illustrating the unit in assembled position.

Fig. 15 is a sectional view taken at right angles to the shaft and housing and illustrating a still different modified form of sealing unit in assembled position with the shaft and housing;

Fig. 16 is a sectional view on line 16—16 of the upper half of the showing in Fig. 15.

In proceeding with this invention, we provide a seal for two spaced concentric cylindrical surfaces which are relatively rotatable. The usual condition which is found is that a shaft extends through a casing, the shaft being the rotary cylindrical surface, while the casing is recessed about the shaft so as to provide the stationary cylindrical surface. This recess retains and positions the seal between these members. The seal is of an annular shape of some resilient material, such as rubber or synthetic rubber, which may be "neoprene," "Duprene" or some such material which may be compressed and will have sufficient elasticity to expand while at the same time will be flexible so that it may be forced into engagement with the rotary member by pressure of the fluid being sealed. In order that this element will not be forced from position, a washer having edge portions is provided which washer may be flexed and forced along the surface to be sealed with its edges engaging back of an annular shoulder or being sharp enough to bite into the surface to prevent axial movement in a return direction. By the use of a washer of this character, the desired compression may be placed upon the annular element from a predetermined size relation of the element and the recess into which it is forced.

With reference to the drawings, the relatively rotating member or shaft is designated 11 which is cylindrical on its outer surface. This shaft extends through the relatively stationary member 12 which is usually a casing through which the shaft 11 extends. A bearing 13 is provided in this casing for the shaft 11. This casing is recessed as at 14 so as to provide a cylindrical concave surface 15 spaced from and concentric with the cylindrical convex surface of the rotary member or shaft 11. A shoulder 16 extends radially from this surface 15 at a point such as shown in Fig. 1 and this recess thus formed serves to receive the sealing unit which is designated generally 17 and shown by itself in Figs. 2 and 3.

This sealing unit 17 comprises an annular element 18 of a resilient material such as soft rubber, "neoprene" or "Duprene" which will have an outer cylindrical surface 19 of a diameter larger than the diameter of cylindrical surface 15 which is to receive it. There is also provided an inner cylindrical surface 20 of a size larger than the cylindrical surface of the member 11 about which this element is to extend. A lip 21 extends inwardly from this cylindrical surface 20, while a recess 22 is provided annularly surrounding the lip 21 as shown in Fig. 2. This lip normally extends inwardly to a diameter so that it will be flexed in being positioned on the shaft 11 and will have an inherent tendency to press against the shaft when in position.

An annular washer 23, shown in Figs. 7 and 8, comprises an annular portion 24 with radially extending fingers 25. These fingers, showing in Figs. 7 and 8, extend outwardly from the annulus 24. This washer 23 is embedded in the element 18 as shown in section in Fig. 2 so that the fingers 25 which are arched slightly as shown in Fig. 2 will have their ends 26 extending flush with or slightly beyond the outer surface 19 of this element 18.

In order to position the unit 17 in the recess 14, the end of the unit 27 is started into the recess 14 and forced inwardly to the left as shown in Fig. 1 causing the fingers 25 of the washer to be bent sufficiently as they move over the cylindrical surface 15 so that the sharp edge or the corner of the finger will bite into the cylindrical surface 15 and prevent any movement of the unit to the right or in a direction reverse from that in which the unit is being forced. The unit is forced sufficiently to the left Fig. 1 so that its end 27 will be compressed and thus a tight seal is formed along the shoulder 16 and also along the cylindrical surface 15. While the lip 21 engages the cylindrical surface of the rotary member or shaft 11, as shown in Fig. 1, and by reason of recess 22 will be forced more firmly into engagement with this surface as the fluid pressure in the chamber 28 connecting with recess 22 increases. The washer will prevent any axial movement of the unit to the right and thus the seal cannot be forced from position.

In Fig. 4, we have illustrated the element 30 as being formed similar to the element 18 above described, but in this case the outer surface 32 is recessed as at 33 providing a shoulder 34, and the washer which is such as shown in Fig. 7 has its inner edge 29 fitted against this shoulder 34 while its fingers 25 extend outwardly beyond the outer surface 35 of the element 30. In this case, however, the recess 36 has one diameter 37 to receive the element 30 while there is another diameter 38 to receive the fingers 25. A shoulder 39 being provided between these two diameters which serves to engage the face of the washer which will limit the insertion of the element 30 into the recess 36. In this case, the washer will be bonded to the element 30 so as to be a part of the same unit.

In Fig. 5, the element 40 is shaped similarly to that shown in Figs. 1 and 2, but in this case the washer 23 is separate from the element 40 although it is in engagement with the element and will be forced with the element 40 into the recess 41 as shown in Fig. 5. The fingers 25 will engage the inner cylindrical surface of the recess as pointed out in case with Figs. 1 and 2.

In Fig. 5, a tool 43 having a portion 44 to engage the washer 23 is utilized for forcing the washer and element into position and this tool will be provided with a shoulder 45 which will engage the end 46 of the casing so as to limit the amount that the element 40 may be compressed as being forced into position. This same sort of a tool may be utilized in the positioning of any of the units herein described.

In Fig. 6, we have illustrated a case having a recess 47 and an element 48 which is in a form reversed from that shown in Fig. 1 in that the lip 49 is formed to engage the outer cylindrical surface 50 of the stationary member 51, while the inner cylindrical surface 52 is compressed by being forced outwardly as it is moved over the cylindrical surface of the shaft or member 11. The recess back of the lip is designated 53 while a washer 54 having outer annulus with inwardly radially extending fingers 55 is embedded in this element 48 with these fingers projecting inwardly beyond the surface 52 so as to be flexed and engage the cylindrical surface of the member or shaft 11 so as to bite into engagement with its surface and maintain the element 48 against axial movement to the right such as shown in Fig. 6. In this case, the element 48 revolves with the shaft while the lip 49 moves along the surface 50.

In Fig. 11, we have illustrated a case having the formation of the case shown in Fig. 1; there being assembled with this case the sealing unit which is the same as shown in Fig. 2 except that the annular washer designated 60 is of a different shape than shown in Fig. 8. This annular washer 60 is embedded in the annular element 18 in the same way as previously described in connection with Fig. 2, but the outer surface of this washer 60 is continuously circular rather than having spaced fingers such as 25 as heretofore described in connection with the annular washer 23. In this case, the annular edge 61 is deflected, as shown in Fig. 11, so as to present a sharp corner which will slide along the surface 15 upon being pressed to the left, as shown in Fig. 11, but which will bite into the surface 15 sufficiently to prevent movement of the element 18 to the right.

In Fig. 13, the case 65 has a modified form of recess 66 presenting an outer concave annular surface 67 for the reception of the annular element 68, while near the entrance to this recess 66 there is a groove 69 extending annularly with a slightly larger entrance bore 70 which connects with the groove 69 and provides a shoulder 71 between the groove into this larger entrance bore 70. The annular element 68 has attached to it the annular washer 72 by reason of there being an opening 73 in the washer with enlarged headed portions 74 of the resilient element extending through and over the surface of the edge of the opening as clearly shown in Figs. 13 and 14. This annular element 72 is somewhat cupped, as shown in Fig. 13, so that its outer edge 75 is of a initial size to pass through the bore 70. After the element 68 has been forced into its sealing position, as shown in Fig. 14, the annular cup washer is upset by striking it sharply so as to deform it from its initial shape as shown in Fig. 13 and cause it to assume a position, such as shown in Fig. 14, so that its edge portion 75 is now of a greater diameter and of a diameter sufficient to extend into the groove 69 and engage the shoulder 71 so as to hold it in position against movement to the right away from its sealing position.

In Fig. 16, the casing 80 is similar to the casing 65 except that the groove 81 extends inwardly from a cylindrical surface 82 which is of the same size from its entrance edge 83 inwardly, and the groove thus forms a shoulder as at 84 for the reception of a retaining member 85, which is substantially annular but split to provide spaced ends 86 and 87, and which is embedded within the element 88. In this case, the split ring 85 will contract by moving inwardly radially sufficiently so that the element with this split ring may be passed into the bore 82 to such an extent that when the ring 85 registers with the groove 84 it will expand into the groove and its face will engage the shoulder 84 so as to hold the element against movement to the right as shown in Fig. 16. In the other respects, Figs. 11 to 16 are the same and embody the principles previously set forth in connection with this invention.

We claim:

1. In combination a rotary member and a relatively stationary member, said members presenting spaced concentric cylindrical surfaces, a seal for said surfaces comprising an annular element of resilient material having the characteristics of elastic rubber firmly engaging one of said surfaces by its inherent tendency to expand from being placed under compression due to its different diameter, said element having a flexible lip being of a different diameter than and flexed to engage the other of said surfaces to be pressed more firmly into engagement therewith by the said pressure to be sealed and a substantially annular washer substantially embedded in said annular element to provide a single unit therewith and having a radially extending portion projecting beyond the element with its edge of such a diameter relative to the diameter of the cylindrical surface to be engaged that it will be flexed when in engagement therewith and maintained at an angle to a plane at right angles to the rotary axis having an inherent tendency to return from flexed position, to have holding engagement with said surface and prevent axial movement of the element in one direction.

2. The combination set forth in claim 1 wherein the radially extending portions extend radially outwardly to engage the outer cylindrical surface.

3. The combination set forth in claim 1 wherein the radially extending portions extend radially inwardly to engage the inner cylindrical surface.

4. The combination set forth in claim 1 wherein the radially extending portion comprises a plurality of spaced fingers.

5. The combination set forth in claim 1 wherein said radially extending portions are fingers on said annular washer extending radially inwardly to engage the inner cylindrical surface.

JUSTUS B. STEVENS.
FRANK BOTTOMLEY.

REFERENCES CITED

The following references are of record in the file of this patent:

UNITED STATES PATENTS

| Number | Name | Date |
| --- | --- | --- |
| 2,088,703 | Hubbard et al. | Aug. 3, 1937 |
| 2,145,928 | Heinze et al. | Feb. 7, 1939 |
| 2,183,004 | Boyd | Dec. 12, 1939 |
| 2,273,380 | Searles | Feb. 17, 1942 |
| 2,276,225 | Carter | Mar. 10, 1942 |
| 2,310,405 | Dodge | Feb. 9, 1943 |
| 2,310,607 | Batesole | Feb. 9, 1943 |
| 2,402,050 | Ingalls | June 11, 1946 |
| 2,464,022 | Carpenter | Mar. 8, 1949 |

FOREIGN PATENTS

| Number | Country | Date |
| --- | --- | --- |
| 421,035 | Germany | 1925 |
| 430,173 | Great Britain | 1935 |